(12) United States Patent
Kangyo et al.

(10) Patent No.: US 9,521,717 B2
(45) Date of Patent: Dec. 13, 2016

(54) LED DRIVER, LIGHTING EQUIPMENT AND LIGHT FIXTURE

(71) Applicant: Panasonic Intellectual Property Management Co., Ltd., Osaka (JP)

(72) Inventors: Miyo Kangyo, Osaka (JP); Koji Watanabe, Kyoto (JP); Kazuhiro Kumada, Hyogo (JP); Shinichi Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/044,634

(22) Filed: Feb. 16, 2016

(65) Prior Publication Data

US 2016/0262226 A1  Sep. 8, 2016

(30) Foreign Application Priority Data

Mar. 3, 2015  (JP) ................. 2015-041688

(51) Int. Cl.
*H05B 33/08* (2006.01)
*H05B 37/02* (2006.01)

(52) U.S. Cl.
CPC ........ *H05B 33/0815* (2013.01); *H05B 33/089* (2013.01); *H05B 33/0845* (2013.01); *H05B 33/0887* (2013.01); *H05B 37/02* (2013.01)

(58) Field of Classification Search
CPC ............ H05B 33/0815; H05B 33/0887; H05B 33/089; H05B 3/086; H05B 37/0209; H05B 33/0842; H05B 37/0218; H05B 37/0227; H05B 39/02; H05B 6/682; H05B 33/0845; H02H 9/002
See application file for complete search history.

(56) References Cited

U.S. PATENT DOCUMENTS

| 7,352,135 | B2* | 4/2008 | Shiotsu | H05B 33/089 |
| | | | | 315/224 |
| 8,344,638 | B2* | 1/2013 | Shteynberg | H05B 33/0815 |
| | | | | 315/185 S |
| 8,502,463 | B2* | 8/2013 | Mizukawa | H05B 33/089 |
| | | | | 315/119 |
| 2012/0262087 | A1 | 10/2012 | Watanabe et al. | |
| 2013/0088172 | A1* | 4/2013 | Kikuchi | H05B 33/089 |
| | | | | 315/307 |

(Continued)

FOREIGN PATENT DOCUMENTS

| EP | 2693843 A1 * | 2/2014 | ......... H05B 33/0815 |
| JP | 2012-221899 A | 11/2012 | |

(Continued)

*Primary Examiner* — Vibol Tan
(74) *Attorney, Agent, or Firm* — Renner, Otto, Boisselle & Sklar, LLP

(57) ABSTRACT

When supplying an LED light source with a first output voltage that is equal to or higher than a threshold voltage, an LED driver causes a DC power supply to output a first DC voltage and causes a switching regulator to supply the LED light source with the first output voltage. When supplying the LED light source with a second output voltage that is below the threshold voltage, the LED driver causes the DC power supply to output a second DC voltage lower than the first DC voltage and causes the dropper regulator to supply the LED light source with the second output voltage.

12 Claims, 5 Drawing Sheets

(56) References Cited

U.S. PATENT DOCUMENTS

2014/0009077 A1\* 1/2014 Yoshimoto ......... H05B 33/0845
　　　　　　　　　　　　　　　　　　　　　　315/210
2015/0216012 A1　 7/2015 Nagasaka et al.

FOREIGN PATENT DOCUMENTS

| JP | 2013-051074 A | 3/2013 |
| JP | 2014-007078 A | 1/2014 |
| JP | 2014-032748 A | 2/2014 |
| JP | 5596236 B1 | 8/2014 |

\* cited by examiner

LED DRIVER, LIGHTING EQUIPMENT AND LIGHT FIXTURE

CROSS REFERENCE TO RELATED APPLICATIONS

This application claims the benefit and priority of Japanese Patent Application No. 2015-041688, filed on Mar. 3, 2015, the entire contents of which are incorporated herein by reference.

TECHNICAL FIELD

The disclosure relates generally to LED drivers, lighting equipment and light fixtures and, more particularly, to an LED (Light-Emitting Diode) driver configured to drive (light) an LED light source, lighting equipment including an LED light source as an illumination light source and the LED driver, and a light fixture having the lighting equipment.

BACKGROUND ART

A solid light source lighting device as a prior art is exemplified in JP Pub. No. 2012-221899 (hereinafter referred to as "Document 1"). The solid light source lighting device described in Document 1 includes a buck chopper circuit, and is configured to dim, namely adjust a light output of a solid light source (e.g., an LED (Light-Emitting Diode) light source) by controlling the buck chopper circuit so that an output current to the solid light source is increased and decreased.

With the solid light source lighting device described in Document 1, a load current (an electric current flowing through the solid light source) is increased and decreased by lengthening and shortening (increasing and decreasing) an ON time (an ON duty ratio) of a switching device (a semiconductor device such as a transistor) forming the buck chopper circuit. A dimming method as stated above is called a DC dimming method in general. With the DC dimming method, there is a limit (a lower limit) in an ON period (an ON width) of a drive signal supplied from a drive circuit for driving the switching device to a control terminal (a gate terminal) of the switching device, thereby making it difficult to perform deep dimming.

As another dimming method, there is also a dimming method with a dropper regulator (hereinafter referred to as a "linear dimming method"). In comparison with a switching regulator, the dropper regulator has an advantage of low ripple and low noise, but has disadvantages of low conversion efficiency and the like. With the linear dimming method, a load current is increased and decreased by changing ON resistance of a field effect transistor, for example. The linear dimming method accordingly has an advantage of making it possible to perform deeper dimming than dimming by the DC dimming method.

Therefore, in a solid light source lighting device (an LED driver) that employs the DC dimming method, the DC dimming method is switched to the linear dimming method in order to perform deep dimming.

However, in the case of the linear dimming method, loss increases according to an increase in a difference between input and output voltages of the LED driver, thereby decreasing the conversion efficiency.

SUMMARY

The disclosure has been achieved in view of the above circumstances, and an object thereof is to enlarge an adjustment range of a drive current for driving an LED light source while reducing loss.

An LED driver according to an aspect is configured to light an LED light source. The LED driver includes a DC power supply, a switching regulator, a dropper regulator and a controller. The DC power supply is configured to selectively output (either) a first DC voltage or a second DC voltage lower than the first DC voltage. The switching regulator is configured to reduce the first DC voltage to supply the LED light source with a first output voltage that is equal to or higher than a threshold voltage. The dropper regulator is configured to reduce the second DC voltage to supply the LED light source with a second output voltage that is below the threshold voltage. The controller is configured to, when supplying the LED light source with the first output voltage, cause the DC power supply to output the first DC voltage and cause the switching regulator to supply the LED light source with the first output voltage. The controller is further configured to, when supplying the LED light source with the second output voltage, cause the DC power supply to output the second DC voltage and cause the dropper regulator to supply the LED light source with the second output voltage.

Lighting equipment according to an aspect includes the LED driver, and the LED light source as an illumination light source. The LED light source includes a plurality of LEDs.

A light fixture according to an aspect includes the lighting equipment, and a fixture body that supports at least the LED light source.

The LED driver, the lighting equipment and the light fixture can enlarge an adjustment range of a drive current for driving the LED light source while reducing loss.

BRIEF DESCRIPTION OF THE DRAWINGS

The figures depict one or more implementations in accordance with the present teaching, by way of example only, not by way of limitations. In the figure, like reference numerals refer to the same or similar elements where.

DETAILED DESCRIPTION

Figure 1:
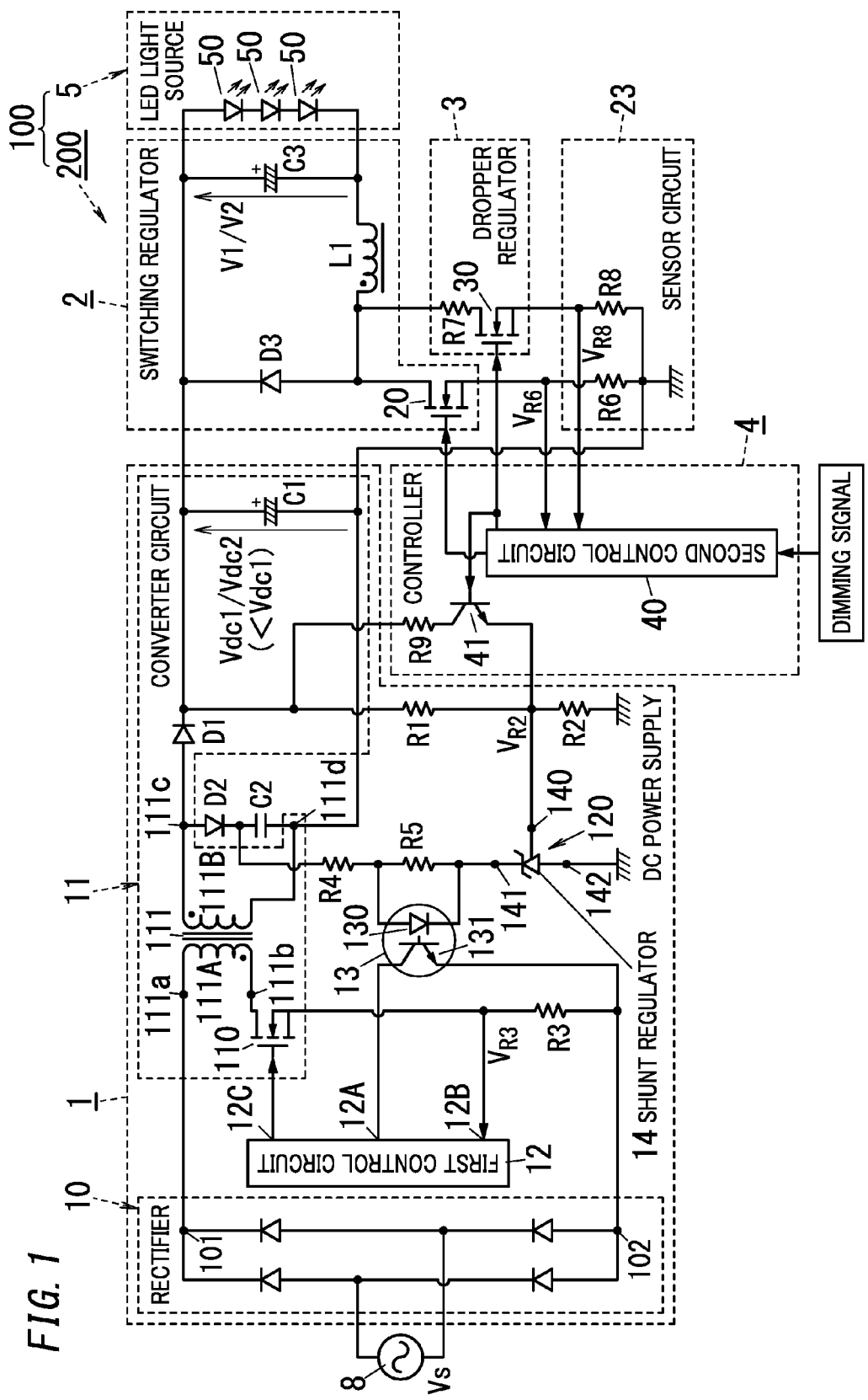
FIG. 1 is a circuit diagram of an LED driver and lighting equipment, in accordance with an embodiment.

An LED (Light-Emitting Diode) driver and lighting equipment, in accordance with an embodiment will be explained with reference to FIGS. 1 to 4.

The LED driver 200 according to the embodiment is configured to light an LED light source 5. In an example of FIG. 1, the LED driver 200 includes a DC (Direct Current) power supply 1, a switching regulator 2, a dropper regulator 3 and a controller 4.

As shown in FIG. 1, the lighting equipment 100 according to the embodiment includes the LED driver 200 and the LED light source 5. The LED light source 5 is formed of a series circuit of a plurality of (three in the example of FIG. 1) LEDs 50. The number of LEDs 50 constituting the LED light source 5 is not limited to three, but may be two or less or four or more. The LED light source 5 may be also formed of a parallel circuit of LED arrays each of which includes a plurality of (e.g., twenty) LEDs in series. The LED light source 5 is electrically connected between output terminals of the LED driver 200 (between both ends of a second smoothing capacitor C3 to be described later).

In the embodiment, the DC power supply 1 is configured to selectively output (either) a first DC voltage Vdc1 or a second DC voltage Vdc2 lower than the first DC voltage Vdc1.

In the example of FIG. 1, the DC power supply 1 preferably includes a rectifier 10 configured to rectify an AC (Alternating Current) voltage Vs to produce a pulsating voltage, a converter circuit 11 configured to convert the pulsating voltage into (either) the first DC voltage Vdc1 or the second DC voltage Vdc2, and a first control circuit 12 configured to control the converter circuit 11. The DC power supply 1 further includes a photo-coupler 13 and a shunt regulator 14.

In the embodiment, the converter circuit 11 includes a first inductor 111A and a first switching device 110 that are electrically connected in series with each other and configured to be supplied with a DC voltage, and a first smoothing capacitor C1 configured to be charged by at least an ON-OFF switching operation of the first switching device 110. In an example, the converter circuit 11 is a flyback converter. In another example, the converter circuit 11 is a boost converter configured to be supplied with a DC voltage from a DC power supply such as a battery. In still another example, the converter circuit 11 further includes a switching device constituting a half bridge circuit along with the first switching device 110, and the first smoothing capacitor C1 is configured to be charged by an ON-OFF switching operation of the first switching device 110 and the switching device constituting the half bridge circuit.

In the example of FIG. 1, the converter circuit 11 includes the first switching device 110, a transformer 111, a diode D1 and the first smoothing capacitor C1. Preferably the first switching device 110 is an N-channel enhancement MOS-FET (Metal Oxide Semiconductor Field Effect Transistor). Thus, in the example of FIG. 1, the converter circuit 11 is formed of a known conventional flyback converter.

The transformer 111 has a primary winding 111A as the first inductor, and a secondary winding 111B. The transformer 111 is an additive polarity transformer, and the primary winding 111A has a first end 111$a$, and a second end 111$b$ as a dot end, while the secondary winding 111B has a first end 111$c$ as a dot end, and a second end 111$d$. Polarity of the second end 111$b$ is the same as polarity of the first end 111$c$. The first end 111$a$ of the first inductor 111A is electrically connected with the positive output terminal (a high potential-side terminal) 101 of the rectifier 10. The second end 111$b$ of the first inductor 111A is electrically connected with a first terminal (a drain terminal) of the first switching device 110. The first end 111$c$ of the secondary winding 111B is electrically connected with an anode terminal of the diode D1. The second end 111$d$ of the secondary winding 111B is electrically connected with a negative terminal (a low potential-side terminal) of the first smoothing capacitor C1. A positive terminal (a high potential-side terminal) of the first smoothing capacitor C1 is electrically connected with a cathode terminal of the diode D1. A second terminal (a source terminal) of the first switching device 110 is electrically connected with a side of the negative output terminal (a low potential-side output terminal) 102 of the rectifier 10. A control terminal (a gate terminal) of the first switching device 110 is electrically connected with an output terminal 12C of the first control circuit 12.

In the embodiment, the DC power supply 1 further includes a voltage sensor R2 and the first control circuit 12. The voltage sensor R2 is electrically connected in parallel with the first smoothing capacitor C1 and configured to detect a voltage across the first smoothing capacitor C1 as an output voltage of the DC power supply 1 to obtain a first detection value $V_{R2}$. The first control circuit 12 is configured to turn off the first switching device 110 based on the first detection value $V_{R2}$.

In an example, the DC power supply 1 further includes an output voltage monitor 120 that is configured to supply the first control circuit 12 with, as the first detection value $V_{R2}$, an error value corresponding to a difference between the first detection value $V_{R2}$ and a reference value. In this example, the first control circuit 12 may be configured to operate at a peak current mode or a voltage mode. It is desirable that the output voltage monitor circuit 120 include the photo-coupler 13 in the case where the converter circuit 11 of the DC power supply 1 includes the transformer 111.

Figure 2A:
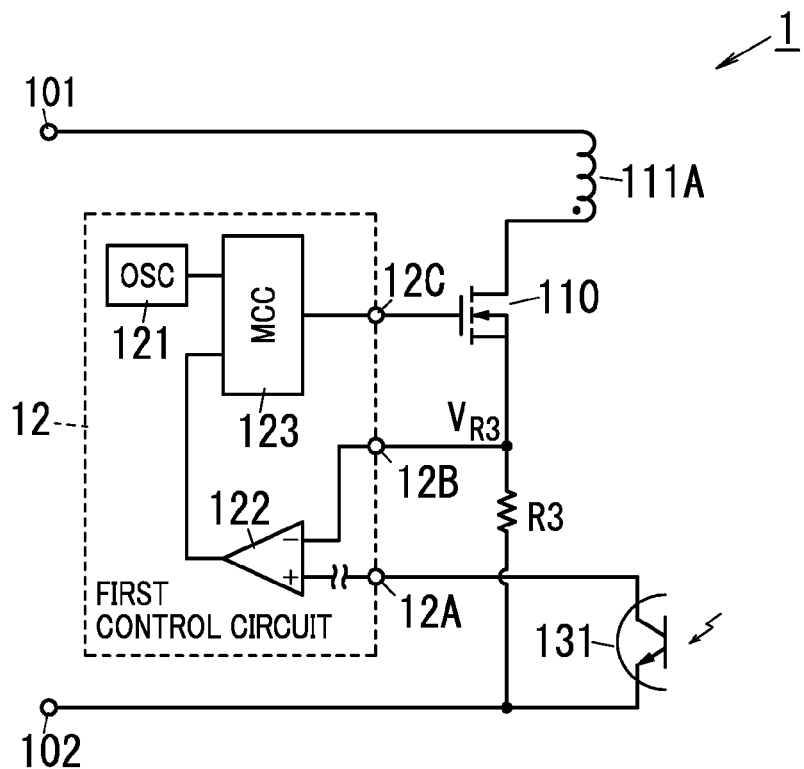
FIG. 2A is a circuit diagram in relevant part of a DC power supply as an example in the LED driver.

In an example of the peak current mode, as shown in FIGS. 1 and 2A, the DC power supply 1 further includes a first current sensor R3 that is configured to detect an electric current flowing through the first switching device 110 to obtain a current detection value $V_{R3}$. A first control circuit 12 includes an oscillator 121, a comparator 122, a main control circuit (MCC) 123 and the like. The oscillator 121 is configured to generate an oscillation signal. The comparator 122 is configured to compare the current detection value $V_{R3}$ with a target value (a target voltage) obtained by making a slope (ramp) correction to the first detection value $V_{R2}$ (the error value). The main control circuit 123 includes, e.g., a logic circuit(s) and is configured to turn on the first switching device 110 in accordance with the oscillation signal from the oscillator 121, and then turn off the first switching device 110 when the comparator 122 detects the current detection value $V_{R3}$ reaching the target value.

Figure 2B:
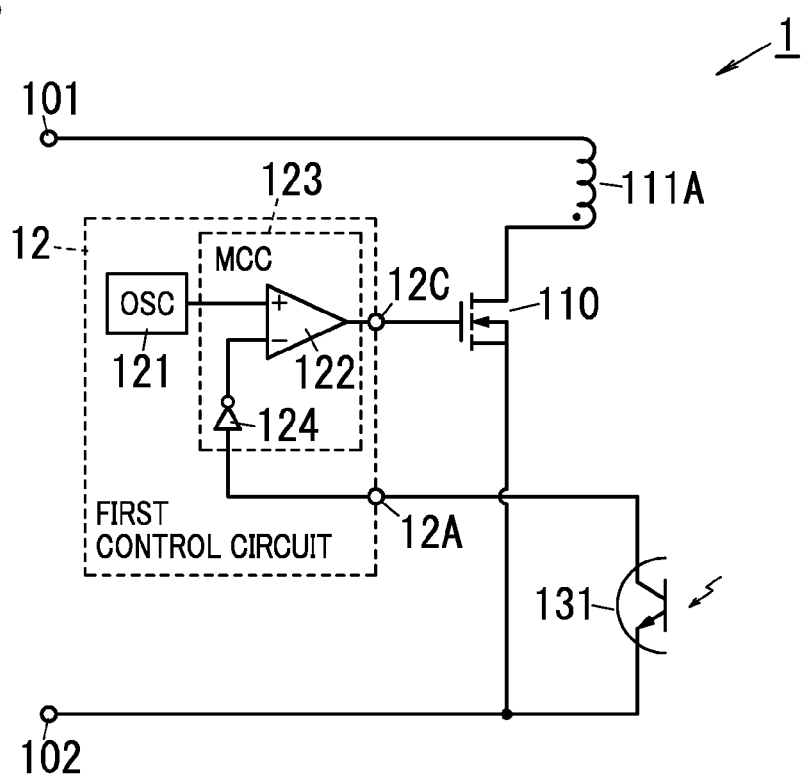
FIG. 2B is a circuit diagram in relevant part of a DC power supply as another example in the LED driver.

In an example of the voltage mode, as shown in FIGS. 1 and 2B, a first control circuit 12 includes an oscillator 121, a main control circuit 123 and the like. The oscillator 121 is configured to generate an oscillation signal (e.g., a triangular wave signal). The main control circuit 123 is configured to turn on and off the first switching device 110 based on the first detection value $V_{R2}$ (e.g., the error value obtained from the first detection value $V_{R2}$) and the oscillation signal. In an example of FIG. 2B, the main control circuit 123 includes a comparator 122 and a NOT circuit (an inverter) 124. The comparator 122 is configured to receive the error value via the NOT circuit 124 and compare the error value with the oscillation signal to turn on and off the first switching device 110 based on the compared result. Specifically, the comparator 122 is configured to turn on the first switching device 110 in accordance with the oscillation signal and then turn off the first switching device 110 when the phototransistor 131 is turned on, namely when the error value is equal to or larger than the abovementioned reference value. In another example, the DC power supply 1 may further include a first current sensor R3 (see FIG. 2A) that is configured to detect an electric current flowing through the first switching device 110 to obtain a current detection value $V_{R3}$. In this example, the main control circuit 123 is configured to turn on the first switching device 110 when the current detection value $V_{R3}$ is equal to or less than a threshold for turning on the first switching device 110. Thus, the first control circuit 12 in the embodiment is configured to turn off the first switching device 110 based on the first detection value $V_{R2}$ after turning on the first switching device 110.

In the example of FIG. 1, the voltage sensor (a detection resistor) R2 is electrically connected in series with a resistor (an impedance device) R1, and a series circuit of the resistors R1 and R2 forms a voltage divider circuit that is electrically connected in parallel with the first smoothing capacitor C1. Specifically, a first end of the resistor R1 is electrically connected with the cathode terminal of the diode D1, and a junction of a second end of the resistor R1 and a first end of the resistor R2 is electrically connected with a reference terminal 140 of the shunt regulator 14. A second end of the resistor R2 is grounded. On the other hand, a detection resistor (the first current sensor) R3 is electrically connected between a second terminal (a source terminal) of the first switching device 110 and the negative output terminal (the low potential-side output terminal) 102 of the rectifier 10.

In the example of FIG. 1, a diode D2, a capacitor C2, resistors R4 and R5, the shunt regulator 14 and the photo-coupler 13 constitute the output voltage monitor circuit 120. An anode terminal of the diode D2 is electrically connected with the first end 111c of the secondary winding 111B. A cathode terminal of the diode D2 is electrically connected with the second end 111d of the secondary winding 111B via the capacitor C2. The second end 111d is grounded. The cathode terminal of the diode D2 is also electrically connected with a first end of the resistor R4. A second end of the resistor R4 is electrically connected with a first end of the resistor R5. A second end of the resistor R5 is electrically connected with a cathode terminal 141 of the shunt regulator 14. An anode terminal 142 of the shunt regulator 14 is grounded. The reference terminal 140 of the shunt regulator 14 is electrically connected with a junction of the resistors R1 and R2 constituting the voltage divider circuit.

The shunt regulator 14 has a reference voltage (e.g., 2.5 [V]) corresponding to the abovementioned reference value, and is configured to obtain, as an error value, a difference between the first detection value $V_{R2}$ received at the reference terminal 140 and the reference value. The error value is supplied to the first control circuit 12 via the photo-coupler 13. For example, the shunt regulator 14 is configured to increase an electric current from the cathode terminal 141 to the anode terminal 142 when a feedback voltage (the first detection value) $V_{R2}$ is above the reference voltage, and decrease the electric current from the cathode terminal 141 to the anode terminal 142 when the feedback voltage $V_{R2}$ is below the reference voltage. The feedback voltage $V_{R2}$ is a voltage obtained by dividing an output voltage of the converter circuit 11 (a voltage across the first smoothing capacitor C1) by the divider circuit (R1 and R2). The feedback voltage $V_{R2}$ is given by equation $Vdc1 \times r2/(r1+r2)$, where Vdc1 represents an output voltage of the converter circuit 11 when the switch device 41 to be described later is turned off, r1 represents a resistance value of the resistor R1 and r2 represents a resistance value of the resistor R2.

The photo-coupler 13 is formed of a photodiode 130 and a phototransistor 131. An anode terminal of the photodiode 130 is electrically connected with a junction of the resistors R4 and R5, and a cathode terminal of the photodiode 130 is electrically connected with the cathode terminal 141 of the shunt regulator 14 in a state in which the photodiode 130 is electrically connected in parallel with the resistor R5. A collector terminal of the phototransistor 131 is electrically connected with a sense terminal 12A of the first control circuit 12. An emitter terminal of the phototransistor 131 is electrically connected with the negative output terminal 102 of the rectifier 10.

When the feedback voltage $V_{R2}$ is above the reference voltage, a collector-emitter voltage of the phototransistor 131 decreases because an electric current flowing through the shunt regulator 14 increases and a light amount of the photodiode 130 increases. On the other hand, when the feedback voltage $V_{R2}$ is below the reference voltage, a collector-emitter voltage of the phototransistor 131 increases because the electric current flowing through the shunt regulator 14 decreases and the light amount of the photodiode 130 decreases.

The first control circuit 12 is configured to detect, from a voltage $V_{R3}$ across the detection resistor R3, an electric current (an excitation current) flowing through the first switching device 110. As shown in an example of FIG. 2A, the comparator 122 of the first control circuit 12 is configured to compare the target voltage obtained from a voltage received at the (first) sense terminal 12A (a collector-emitter voltage of the phototransistor 131) and a voltage $V_{R3}$ across the detection resistor R3 received at a (second) sense terminal 12B. The DC power supply 1 includes a control power supply circuit (not shown) configured to produce an operation power of the first control circuit 12. Preferably the control power supply circuit is configured to produce a control power supply voltage (e.g., 3.3 to 5 [V]) from the pulsating voltage obtained from the rectifier 10. The first control circuit 12 may be formed of a commercially available integrated circuit for controlling the flyback converter, for example.

A basic operation of the DC power supply 1 in the case where the switch device 41 is in an OFF state is now explained briefly.

The first control circuit 12 turns on the first switching device 110 by supplying the control terminal of the first switching device 110 with a drive signal (an ON control signal), which is a High level signal and a signal for turning on the first switching device 110, on a rising edge of a rectangular pulse signal with a constant frequency (period) from the oscillator 121. When the first switching device 110 is turned on, an electric current (an excitation current) flows through the primary winding 111A of the transformer 111 and electromotive force having high potential at the first end 111a is generated in the primary winding 111A. On the other hand, electromotive force having high potential at the second end 111d is induced in the secondary winding 111B of the transformer 111. The electromotive force induced in the secondary winding 111B cannot however draw an electric current through the secondary winding 111B because the diode D1 is reverse biased. Therefore, electric energy by the excitation current flowing during an ON period of the first switching device 110 is stored as magnetic energy in the transformer 111. During the ON period of the first switching device 110, the diode D2 is also reverse biased, and accordingly charge of the charged capacitor C2 is discharged into the shunt regulator 14 via the resistors R4 and R5.

When a voltage $V_{R3}$ across the detection resistor R3 equals the target voltage obtained from an input voltage to the sense terminal 12A (the collector-emitter voltage of the phototransistor 131), the first control circuit 12 turns off the first switching device 110 by supplying the control terminal of the first switching device 110 with a drive signal (an OFF control signal) for turning off the first switching device 110. When the first switching device 110 is turned off, electromotive force having high potential at the first end 111c is generated in the secondary winding 111B of the transformer 111, whereby the diode D1 is biased to conduct. As a result, the magnetic energy stored in the transformer 111 is discharged as electric energy into the first smoothing capacitor C1 via the diode D1 and is smoothed with the first smoothing capacitor C1, whereby a DC voltage (an output voltage Vdc1) develops across the first smoothing capacitor C1. The DC voltage is applied to the switching regulator 2. At this time, the diode D2 is also biased to conduct, whereby the capacitor C2 is charged.

The first control circuit 12 then turns on the first switching device 110 again by supplying the control terminal of the first switching device 110 with the ON control signal on a rising edge of the rectangular pulse signal from the oscillator 121. Thus, the first control circuit 12 turns on the first switching device 110 on each rising edge of the signal from the oscillator 121 (each oscillation period) and turns off the first switching device 110 based on the detection values by the resistor R2 and R3 so that the output voltage Vdc1 agrees on a rated value (e.g., a rated voltage of 100 [V]), whereby ON periods of the first switching device 110 (pulse widths of the drive signal) are adjusted. That is, the DC power supply 1 is configured so that the first control circuit 12 performs PWM (Pulse Width Modulation) control of the first switching device 110. The DC power supply 1 can accordingly convert (step up or step down) an input voltage Vs from an AC power supply 8 (e.g., an AC voltage in an effective voltage range between 100 [V] and 240 [V]) into a desired output voltage (e.g., 100 [V]).

In an example, in the case where the switch device 41 is in an OFF state, a target value of the output voltage of the converter circuit 11 is set to 100 [V], the reference voltage of the shunt regulator 14 is set to 2.5 [V], the resistance value r1 of the resistor R1 is set to 390 [kΩ], and the resistance value r2 of the resistor R2 is set to 10 [kΩ]. In this example, the first control circuit 12 performs the PWM control of the first switching device 110 so that the feedback voltage $V_{R2}$ agrees on the reference voltage of the shunt regulator 14, whereby the output voltage of the DC power supply 1 is stabilized at 100 [V].

In the embodiment, the switching regulator 2 is configured to reduce the first DC voltage Vdc1 to supply the LED light source 5 with a first output voltage V1 that is equal to or higher than a threshold voltage Vth. Preferably, the switching regulator 2 includes a series circuit, which is electrically connected in parallel with the first smoothing capacitor C1, of a second smoothing capacitor C3, a second inductor L1 and a second switching device 20.

The dropper regulator 3 is configured to reduce the second DC voltage Vdc2 to supply the LED light source 5 with a second output voltage V2 that is below the threshold voltage Vth. Preferably, the dropper regulator 3 includes an active device 30 that has variable ON resistance and is electrically connected in parallel with at least the second switching device 20 of the series circuit (C3, L1 and 20) of the switching regulator 2.

The LED driver 200 further includes a sensor circuit 23. The sensor circuit 23 is configured to detect an electric current flowing through the second switching device 20 to obtain a second detection value $V_{R6}$ and also detect an electric current flowing through the active device 30 to obtain a third detection value $V_{R8}$. In an example, the sensor circuit 23 includes a second current sensor R6 and a third current sensor R8. The second current sensor R6 is electrically connected between the second switching device 20 and the negative terminal of the first smoothing capacitor C1, and configured to detect an electric current flowing through the second switching device 20 to obtain a second detection value $V_{R6}$. The third current sensor R8 is electrically connected between the active device 30 and the negative terminal of the first smoothing capacitor C1, and configured to detect an electric current flowing through the active device 30 to obtain a third detection value $V_{R8}$. In another example, the sensor circuit 23 includes a single current sensor that is electrically connected between the negative terminal of the first smoothing capacitor C1 and both the second switching device 20 and the active device 30 and configured to detect an electric current flowing through the second switching device 20 or the active device 30 to a second or third detection value, respectively.

In the example of FIG. 1, the sensor circuit 23 includes a resistor (the second current sensor) R6 and a resistor (the third current sensor) R8. The switching regulator 2 includes the second switching device 20, a diode D3, the second smoothing capacitor C3 and the second inductor L1. A cathode terminal of the diode D3 is electrically connected with the positive terminal of the first smoothing capacitor C1. The second switching device 20 is formed of an N-channel enhancement MOSFET. A first terminal (a drain terminal) of the second switching device 20 is electrically connected with an anode terminal of the diode D3 and a first end of the second inductor L1, and a second terminal (a source terminal) of the second switching device 20 is connected to the ground (the negative terminal of the first smoothing capacitor C1) via the resistor R6. A second end of the second inductor L1 is electrically connected with the negative terminal of the second smoothing capacitor C3. The LED light source 5 is electrically connected in parallel with the second smoothing capacitor C3. The switching regulator 2 is a known conventional buck chopper circuit, and is configured so that the second switching device 20 reduces the output voltage Vdc1 of the DC power supply 1 in accordance with a PWM control signal from a controller 4 to supply the LED light source 5 with a DC voltage V1 corresponding to the PWM control signal.

The dropper regulator 3 includes a transistor (the active device) 30 and a resistor R7. The transistor 30 is formed of an N-channel enhancement MOSFET. A first terminal (a drain terminal) of the transistor 30 is electrically connected with the first end of the second inductor L1 (the drain terminal of the second switching device 20) via the resistor R7. A second terminal (a source terminal) of the transistor 30 is connected to the ground via the resistor R8. An output voltage Vdc2 of the DC power supply 1 is applied across a series circuit of the second smoothing capacitor C3, the second inductor L1, the two resistors R7 and R8 and ON resistance of the transistor 30. That is, the dropper regulator 3 is configured to adjust a voltage across the second smoothing capacitor C3 (an output voltage V2 of the LED driver 200) by varying the ON resistance of the transistor 30. The ON resistance of the transistor 30 varies according to a gate voltage applied to the gate terminal of the transistor 30 from a second control circuit 40 of the controller 4 as described below.

In the embodiment, the controller 4 is configured to, when supplying the LED light source 5 with the first output voltage V1, cause the DC power supply 1 to output the first DC voltage Vdc1 and cause the switching regulator 2 to supply the LED light source 5 with the first output voltage V1. The controller 4 is also configured to, when supplying the LED light source 5 with the second output voltage V2, cause the DC power supply 1 to output the second DC voltage Vdc2 and cause the dropper regulator 3 to supply the LED light source 5 with the second output voltage V2. Preferably the controller 4 is configured to control the converter circuit 11 so that a voltage to be output from the converter circuit 11 is switched to (either) the first DC voltage Vdc1 or the second DC voltage Vdc2.

More preferably the controller 4 includes a series circuit of an impedance device R9 and a switch device 41, and the series circuit (R9 and 41) is electrically connected in parallel with an impedance device R1. The impedance device R1 is electrically connected in series with the voltage sensor R2 while a series circuit of the impedance device R1 and the voltage sensor R2 is electrically connected in parallel with the first smoothing capacitor C1. The controller 4 is configured to turn off the switch device 41 when supplying the LED light source 5 with the first output voltage V1, and turn on the switch device 41 when supplying the LED light source 5 with the second output voltage V2.

In the embodiment, the controller 4 is configured to, when the switch device 41 is turned off, to control an ON-OFF switching operation of the second switching device 20 so that the second detection value $V_{R6}$ corresponds to an electric current value of a light output represented by a dimming signal for setting the light output of the LED light source 5. The controller 4 is also configured to, when the switch device 41 is turned on, to adjust the ON resistance of the active device 30 so that the third detection value $V_{R8}$ corresponds to an electric current value of a light output represented by the dimming signal.

Figure 3:
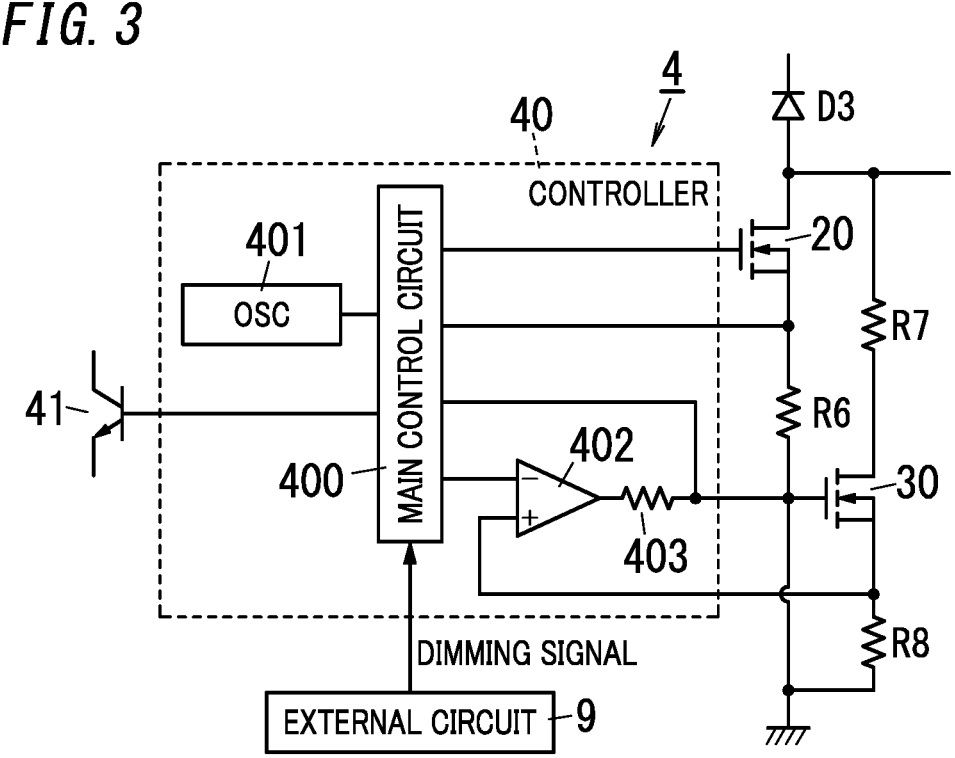
FIG. 3 is a circuit diagram of a second control circuit in the LED driver.

In an example, as shown in FIG. 3, the controller 4 includes the second control circuit 40 that includes an oscillator 401, an error amplifier 402, a resistor 403 and a main control circuit 400. The oscillator 401 is configured to generate an oscillation signal. A non-inverting input terminal of the error amplifier 402 is electrically connected with a junction of the active device 30 and the sensor circuit 23 (the third current sensor R8). An inverting input terminal of the error amplifier 402 is electrically connected with the main control circuit 400. An output terminal of the error amplifier 402 is electrically connected with the control terminal of the active device 30 via the resistor 403. The main control circuit 400 is also electrically connected with an output terminal of the oscillator 401, the control terminal of the second switching device 20, the control terminal of the active device 30, a junction of the second switching device 20 and the sensor circuit 23 (the second current sensor R6), and a control terminal of the switch device 41. The main control circuit 400 is configured to, when turning off the switch device 41, turn on the second switching device 20 in accordance with an oscillation signal from the oscillator 401 and then turn off the second switching device 20 when the second detection value $V_{R6}$ reaches a threshold (an electric current value) corresponding to a light output obtained from a dimming signal for adjusting a light output of the LED light source 5 form an external device (e.g., a dimmer), while turning off the active device 30. The main control circuit 400 is also configured to, when turning on the switch device 41, supply the inverting input terminal of the error amplifier 402 with a voltage corresponding to a threshold (an electric current value) obtained from the dimming signal, while turning off the second switching device 20. The error amplifier 402 is configured to supply the control terminal of the active device 30 with a control signal obtained from a difference between the electric current value obtained from the dimming signal and the third detection value $V_{R8}$.

In the example of FIG. 1, the controller 4 includes the second control circuit 40, the switch device 41 and a resistor R9. The switch device 41 is formed of a PNP bipolar transistor. A first terminal (a collector terminal) of the switch device 41 is electrically connected with the cathode terminal of the diode D1 and the first end of the resistor R1 via the resistor 9, and a second terminal (an emitter terminal) of the switch device 41 is electrically connected with the reference terminal 140 of the shunt regulator 14 and the junction of the voltage divider circuit (R1 and R2). That is, the controller 4 is configured to change a division ratio of the voltage divider circuit by connecting the resistor R9 in parallel with the resistor R1 while the switch device 41 is in an ON state.

The second control circuit 40 is configured to control an output level of the switching regulator 40, an output level of the dropper regulator 3, and a change of the division ratio of the voltage divider circuit (R1 and R2). The second control circuit 40 may be a processor (a micro controller), or integrated circuit(s) configured to perform respective controls as described herein.

The control of the output level by the second control circuit 40 with respect to the switching regulator 2 will be explained.

The second control circuit 40 turns off the switch device 41 and also turns off the active device 30 so that no electric current substantially flows from the first terminal to the second terminal of the active device 30. In this state, the second control circuit 40 turns on the second switching device 20 in accordance with the oscillation signal from the oscillator 401. While the second switching device 20 is turned on, an output voltage Vdc1 of the DC power supply 1 is applied across a series circuit of the second smoothing capacitor C3, the second inductor L1, the second switching device 20 and the resistor R6, and an electric current flows through the series circuit. That is, the electric current flows from the positive terminal to the negative terminal of the first smoothing capacitor C1 via the series circuit. After turning on the second switching device 20, the second control circuit 40 turns off the second switching device 20 when a voltage $V_{R6}$ across the resistor R6 reaches a threshold corresponding to the light output obtained from the dimming signal. When the second switching device 20 is turned off, energy (magnetic energy) stored in the second inductor L1 is discharged, whereby an electric current flows through the closed circuit of the second inductor L1, the diode D3, the second smoothing capacitor C3 and the second inductor L1. Thus, a DC voltage (a reduced DC voltage) lower than the output voltage Vdc1 of the DC power supply 1 is generated across the second smoothing capacitor C3, and the DC voltage (an output voltage V1 of the switching regulator 2) is applied across the LED light source 5. That is, according to the dimming signal, the second control circuit 40 varies the threshold that is compared with the voltage $V_{R6}$ across the resistor R6, thereby performing PWM control of the second switching device 20 to increase and decrease the output voltage. It is desirable that the dimming signal be a signal for instructing a dimming level by magnitude of a DC voltage. The dimming level corresponding to the light output (a dimming light output) obtained from the dimming signal is represented by a ratio of the DC voltage obtained from the dimming signal to a rated voltage of the LED light source 5 (forward voltage of LED 50×Number of LEDs 50) corresponding to the light amount of 100%, as a ratio of the dimming light output to the light amount of 100%.

The control of the output level by the second control circuit 40 with respect to the dropper regulator 3 will be explained.

The second control circuit 40 turns on the switch device 41 and also turns off the second switching device 20. In this state, the second control circuit 40 controls a gate voltage of the transistor 30 in accordance with a dimming signal, thereby controlling (adjusting) ON resistance of the transistor 30 to adjust a voltage across the second smoothing capacitor C3 to a voltage corresponding to an light output obtained from the dimming signal. When the second control circuit 40 increases the gate voltage of the transistor 30, the ON resistance of the transistor 30 decreases and therefore an electric current flowing through the transistor 30 and the resistor R7 (R8 as well) increases and a voltage across a series circuit of the transistor 30 and the resistors R7 and R8 increases. Since a constant voltage Vdc2 of the DC power supply 1 is applied across a series circuit of the second smoothing capacitor C3, the second inductor L1, the resistor R7, the transistor 30 and the resistor R8, a voltage across the second smoothing capacitor C3 decreases. Similarly, the voltage across the second smoothing capacitor C3 increases when the second control circuit 40 decreases the gate voltage of the transistor 30.

The control of the change of the division ratio by the second control circuit 40 will be explained.

The second control circuit 40 is configured to apply an ON voltage to the base terminal of the switch device 41 when applying a gate voltage to the gate terminal of the transistor 30. That is, when activating the dropper regulator 3, the second control circuit 40 deactivates the switching regulator 2 and turns on the switch device 41. When activating the switching regulator 2, the second control circuit 40 deactivates the dropper regulator 3 and turns off the switch device 41.

When the switch device 41 is turned on, the resistor R9 is electrically connected in parallel with the resistor R1. At this time, the feedback voltage $V_{R2}$ can be obtained by equation Vdc2×r2/(rx+r2), where Vdc2 represents an output of the DC power supply 1 when the switch device 41 is turned on and rx represents a resistance value of a parallel circuit of the resistors R1 and R9. The resistance value rx can be obtained by 1/rx=(1/r1)+(1/r9), where r9 represents a resistance value of the resistor R9. In the case where the resistance value r1 of the resistor R1 is set to 390 [kΩ], the resistance value r2 of the resistor R2 is set to 10 [kΩ] and the resistance value r9 of the resistor R9 is set to 560 [kΩ], the first control circuit 12 performs PWM control of the first switching device 110, whereby the output voltage Vdc2 of the DC power supply 1 is stabilized at 60 [V].

Figure 4:
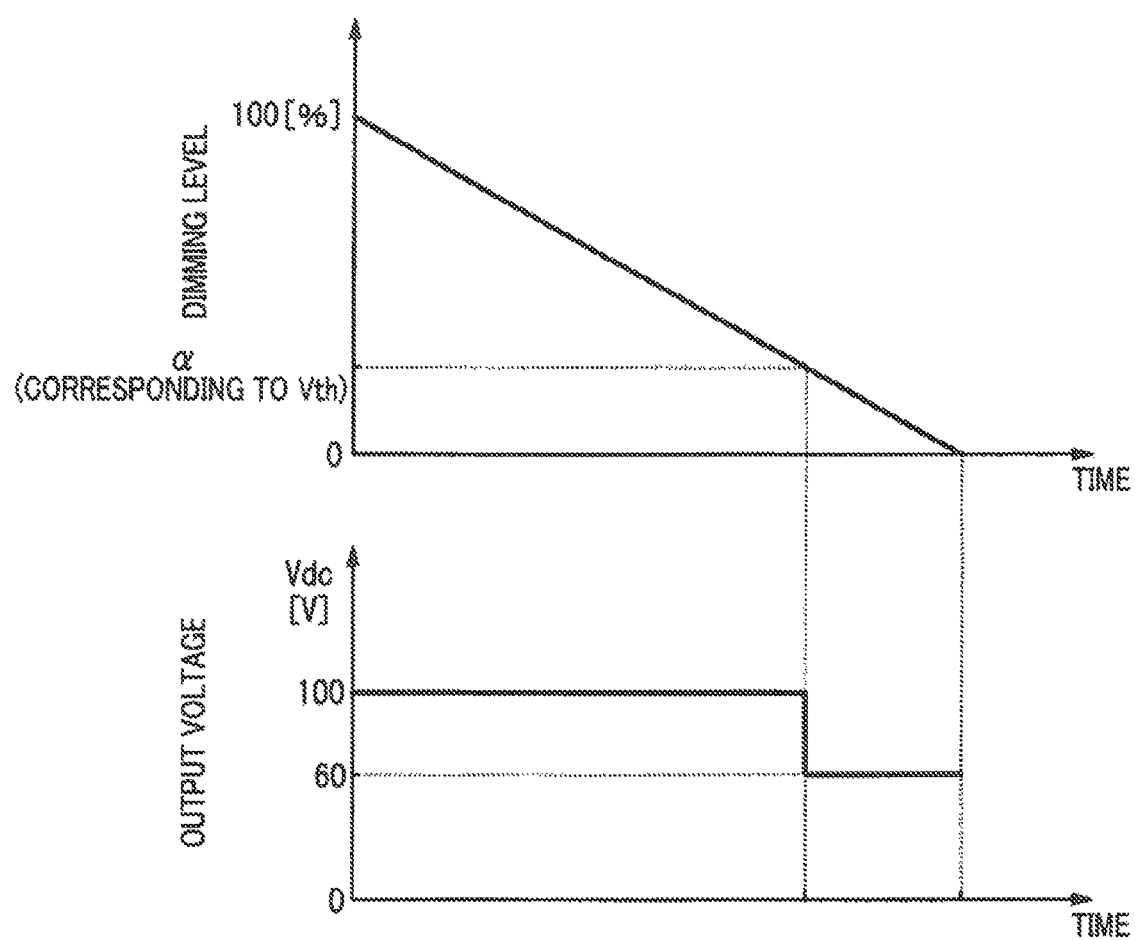
FIG. 4 is waveform chart illustrating operations of the embodiment.

An operation of the lighting equipment 100 as an representative example of an operation of the LED driver 200 in the embodiment will be explained in detail with reference to FIGS. 1 and 4. In the example below, a rated voltage of the LED light source is 70 [V], and a minimum voltage thereof is 50 [V].

When a dimming level instructed by the dimming signal is in a range that is α % (e.g., α=20) or more and 100% or less, the second control circuit 40 activates the switching regulator 2 with the switch device 41 turned off and with the dropper regulator 3 deactivated. For example, the second control circuit 40 shortens an ON period of the second switching device 20 as the dimming level decreases, thereby decreasing an output voltage V1 of the LED driver 200 (a voltage across the second smoothing capacitor C3). As a result, a light amount of the LED light source 5 (a drive current of LEDs 50) is decreased. Since the switch device 41 is turned off, the output voltage of the DC power supply 1 is kept at 100 [V] (see FIG. 4).

When a dimming level instructed by the dimming signal is below α %, the second control circuit 40 activates the dropper regulator 3 with the switch device 41 turned on and with the switching regulator 2 deactivated. For example, the second control circuit 40 increases the ON resistance of the transistor 30 as the dimming level is smaller than α %, thereby decreasing an output voltage V2 of the LED driver 200 (a voltage across the second smoothing capacitor C3). As a result, the light amount of the LED light source 5 (a drive current of LEDs 50) is further decreased. Since the switch device 41 is turned on, the output voltage of the DC power supply 1 is changed at 60 [V] (see FIG. 4).

If the output voltage of the DC power supply 1 is kept at 100 [V] when the second control circuit 40 activates the dropper regulator 3, circuit loss increases (efficiency decreases) because a maximum voltage of 50 [V] (=100−50) may be applied to the resistor R7.

In the LED driver 200 and the lighting equipment 100 in the embodiment, while activating the dropper regulator 3, the second control circuit 40 changes the output voltage of the DC power supply 1 to 60 [V]. Therefore, the voltage applied to the resistor R7 is 10 [V] (=60− 50) at maximum and the loss can be reduced (the efficiency can be improved). Thus, the LED driver 200 and the lighting equipment 100 in the embodiment can enlarge an adjustment range (a dimming range) of a drive current for driving the LED light source 5 (LEDs 50) while reducing the loss. Output voltage values of the DC power supply 1 (100 [V] and 60 [V], the resistance value r1 and the like are one example, and the embodiment is not limited the exemplified values.

As stated above, the LED driver 200 according to the embodiment is configured to light the LED light source 5 (LEDs 50). The LED driver 200 includes the DC power supply 1, the switching regulator 2, the dropper regulator 3 and the controller 4. The DC power supply 1 is configured to selectively output (either) a first DC voltage Vdc1 (e.g., the output voltage Vdc1=100 [V]) or a second DC voltage Vdc2 lower than the first DC voltage Vdc1 (e.g., the output voltage Vdc2=60 [V]. The switching regulator 2 is configured to reduce the first DC voltage Vdc1 to supply the LED light source 5 with a first output voltage V1 that is equal to or higher than a threshold voltage Vth corresponding to the dimming level of α %, for example. The dropper regulator 3 is configured to reduce the second DC voltage Vdc2 to supply the LED light source 5 with a second output voltage V2 that is below the threshold voltage Vth. The controller 4 is configured to, when supplying the LED light source 5 with the first output voltage V1, cause the DC power supply 1 to output the first DC voltage Vdc1 and cause the switching regulator 2 to supply the LED light source 5 with the first output voltage V1. The controller 4 is also configured to, when supplying the LED light source 5 with the second output voltage V2, cause the DC power supply 1 to output the second DC voltage Vdc2 and cause the dropper regulator 3 to supply the LED light source 5 with the second output voltage V2.

The lighting equipment 100 according to the embodiment includes the LED driver 200 and the LED light source 5 as an illumination light source. The LED light source 5 includes a plurality of LEDs 50 that are driven by the LED driver 200.

Since the LED driver 200 and the lighting equipment 100, according to the embodiment are configured as stated above, it is possible to enlarge an adjustment range (a dimming range) of a drive current for driving the LED light source 5 while reducing the loss.

In the LED driver 200 and the lighting equipment 100, according to the embodiment, preferably the DC power supply 1 includes the rectifier 10 configured to rectify an AC voltage Vs to produce a pulsating voltage, and the converter circuit 11 configured to convert the pulsating voltage into (either) the first DC voltage Vdc1 or the second DC voltage Vdc2. Preferably, the controller 4 is configured to control the converter circuit 11 so that a voltage to be output from the converter circuit 11 is switched to (either) the first DC voltage Vdc1 or the second DC voltage Vdc2.

The LED driver 200 and the lighting equipment 100, according to the embodiment are configured as stated above, whereby it is possible to provide a simple circuit capable of enlarging an adjustment range (a dimming range) of a drive current for driving the LED light source 5 while reducing the loss.

Light fixtures according to an embodiment are explained with reference to FIGS. 5A and 5B.

Figure 5A:
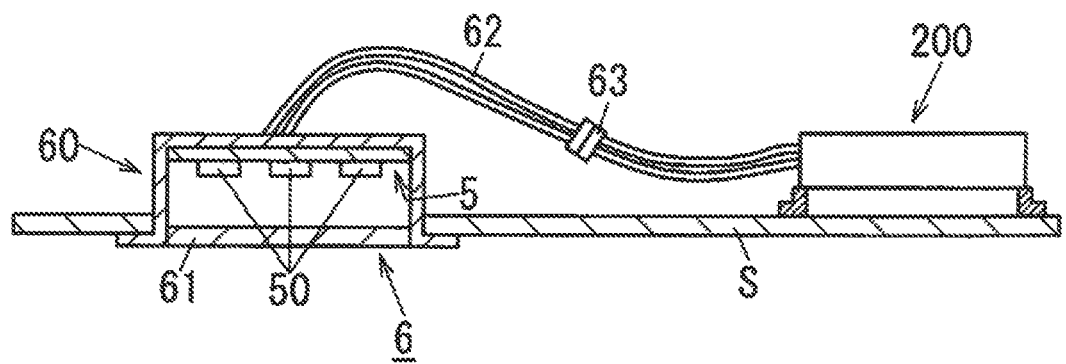
FIG. 5A is a sectional view of a light fixture in accordance with an embodiment.

A light fixture 6 shown in FIG. 5A is a downlight configured to be recessed in a ceiling finishing member S, and formed of a fixture body 60 in which an LED light source 5 is built, and an LED driver 200 configured to be installed on a rear side (an upper side) of the ceiling finishing member S.

In an example of FIG. 5A, the fixture body 60 is formed of a metal member shaped like a hollow cylinder by aluminum die-casting or the like so that it has a top base and an bottom opening. The LED light source 5 is attached on an inner bottom of the fixture body 60. The bottom opening of the fixture body 60 is closed by a cover 61 shaped like a disc. Preferably, the cover 61 is made from an optically transparent material such as glass or polycarbonate.

The LED driver 200 is housed in a metal case shaped like a rectangular case. The LED driver 200 is also electrically connected with the LED light source 5 in the fixture body 60 via power cables 62 and connectors 63.

Figure 5B:
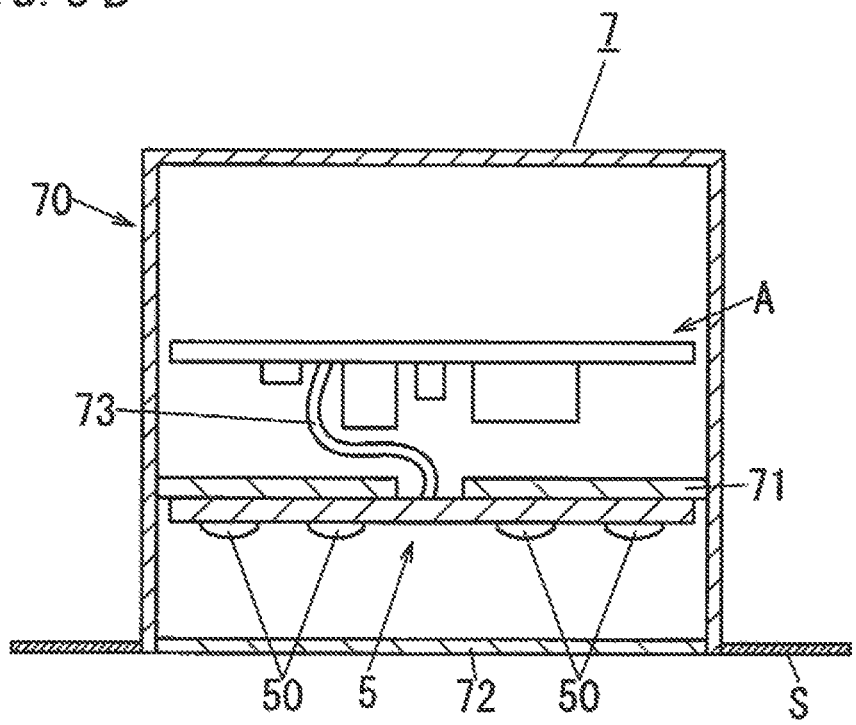
FIG. 5B is a sectional view of another light fixture in accordance with an embodiment.

A light fixture 7 shown in FIG. 5B is a downlight configured to be recessed in a ceiling finishing member S, and formed of an LED light source 5, an LED driver 200 and a fixture body 70. The LED light source 5 and the LED driver 200 are housed in the fixture body 70.

In an example of FIG. 5B, the fixture body 70 is formed of a metal member shaped like a hollow cylinder by aluminum die-casting or the like so that it has a top base and an bottom opening. An inner space of the fixture body 70 is divided into upper and lower spaces by a partition board 71 shaped like a disc. The bottom opening of the fixture body 70 is closed by a disc shaped cover 72 that is made from an optically transparent material such as glass or polycarbonate.

The LED light source 5 is housed in the lower space on a lower side of the partition board 71. The LED driver 200 is housed in the upper space on an upper side of the partition board 71. The LED driver 200 is electrically connected with the LED light source 5 via a power cable 73.

As stated above, the light fixtures 6 and 7 according to the embodiment includes the respective lighting equipment 100 (the LED drivers 200 and the LED light sources 5), and the respective fixture bodies 60 and 70 each of which supports at least its own LED light source 5.

Since the light fixtures 6 and 7 according to the embodiment are configured as stated above, it is possible to enlarge an adjustment range of a drive current for driving each of the LED light sources 5 while reducing loss. Each of the light fixtures 6 and 7 in the embodiment is a downlight, but may be a light fixture except for the downlight.

An LED driver 200 according to an aspect includes a DC power supply 1, a switching regulator 2, a dropper regulator 3 and a controller 4. The DC power supply 1 is configured to controllably provide at an output a first DC voltage Vdc1 or a second DC voltage Vdc2 lower than the first DC voltage Vdc1. The switching regulator 2 is operatively coupled to the output of the DC power supply 1 and configured to controllably reduce the first DC voltage Vdc1 to a first output voltage V1 to be supplied to an LED light source 5. The first output voltage V1 is equal to or higher than a threshold voltage Vth. The dropper regulator 3 is operatively coupled to the output of the DC power supply 1 and configured to controllably reduce the second DC voltage Vdc2 to a second output voltage V2 to be supplied to the LED light source 5. The second output voltage V2 is below the threshold voltage Vth. The controller 4 is responsive to a dimming signal and operatively coupled to the DC power supply 1. The controller 4 is configured to, in response to a value of the dimming signal being greater than or equal to a value corresponding to the threshold voltage Vth, cause the DC power supply 1 to provide at the DC power supply output the first DC voltage Vdc1, and cause the switching regulator 2 to controllably reduce the first DC voltage Vdc1 to the first output voltage V1 in accordance with the value of the dimming signal. The controller 4 is further configured to, in response to the value of the dimming signal being less than the value corresponding to the threshold voltage Vth, cause the DC power supply 1 to provide at the DC power supply output the second DC voltage Vdc2, and cause the dropper regulator 3 to controllably reduce the second DC voltage Vdc2 to the second output voltage V2 in accordance with the value of the dimming signal.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An LED driver, comprising:
   a DC power supply configured to selectively output a first DC voltage or a second DC voltage lower than the first DC voltage;
   a switching regulator configured to reduce the first DC voltage to supply an LED light source with a first output voltage that is equal to or higher than a threshold voltage;
   a dropper regulator configured to reduce the second DC voltage to supply the LED light source with a second output voltage that is below the threshold voltage; and
   a controller configured to:
      cause the DC power supply to output the first DC voltage and cause the switching regulator to supply the LED light source with the first output voltage, thereby supplying the LED light source with the first output voltage; and
      cause the DC power supply to output the second DC voltage and cause the dropper regulator to supply the LED light source with the second output voltage, thereby supplying the LED light source with the second output voltage.

2. The LED driver of claim 1, wherein
   the DC power supply comprises a rectifier configured to rectify an AC voltage to produce a pulsating voltage, and a converter circuit configured to convert the pulsating voltage into the first DC voltage or the second DC voltage, and the controller is configured to control the converter circuit so that a voltage to be output from the converter circuit is switched to the first DC voltage or the second DC voltage.

3. The LED driver of claim 1, wherein
the DC power supply comprises
   a converter circuit comprising a first inductor and a first switching device that are electrically connected in series with each other and configured to be supplied with a DC voltage, and a first smoothing capacitor configured to be charged by at least an ON-OFF switching operation of the first switching device,
   a voltage sensor that is electrically connected in parallel with the first smoothing capacitor and configured to detect a voltage across the first smoothing capacitor as an output voltage of the DC power supply to obtain a first detection value, and
   a control circuit configured to turn off the first switching device based on the first detection value,
wherein the controller comprises a series circuit of an impedance device and a switch device, the series circuit being electrically connected in parallel with an impedance device, the impedance device being electrically connected in series with the voltage sensor while a series circuit of the impedance device and the voltage sensor is electrically connected in parallel with the first smoothing capacitor,
the controller being configured to turn off the switch device when supplying the LED light source with the first output voltage, and turn on the switch device when supplying the LED light source with the second output voltage.

4. The LED driver of claim 3, wherein
the switching regulator comprises a series circuit, which is electrically connected in parallel with the first smoothing capacitor, of a second smoothing capacitor, a second inductor and a second switching device,
the dropper regulator comprises an active device that has variable ON resistance and is electrically connected in parallel with at least the second switching device of the series circuit of the switching regulator,
the LED driver comprises a sensor circuit that is configured to detect an electric current flowing through the second switching device to obtain a second detection value and also detect an electric current flowing through the active device to obtain a third detection value, and
the controller is configured to:
   when the switch device is turned off, control an ON-OFF switching operation of the second switching device so that the second detection value corresponds to an electric current value of a light output represented by a dimming signal for setting the light output of the LED light source; and also
   when the switch device is turned on, adjust the ON resistance of the active device so that the third detection value corresponds to an electric current value of a light output represented by the dimming signal.

5. Lighting equipment, comprising:
an LED light source as an illumination light source, the LED light source comprising a plurality of LEDs; and
an LED driver, comprising:
   a DC power supply configured to selectively output a first DC voltage or a second DC voltage lower than the first DC voltage;
   a switching regulator configured to reduce the first DC voltage to supply an LED light source with a first output voltage that is equal to or higher than a threshold voltage;
   a dropper regulator configured to reduce the second DC voltage to supply the LED light source with a second output voltage that is below the threshold voltage; and
   a controller configured to: cause the DC power supply to output the first DC voltage and cause the switching regulator to supply the LED light source with the first output voltage, thereby supplying the LED light source with the first output voltage; and cause the DC power supply to output the second DC voltage and cause the dropper regulator to supply the LED light source with the second output voltage, thereby supplying the LED light source with the second output voltage.

6. The lighting equipment of claim 5, wherein
the DC power supply comprises a rectifier configured to rectify an AC voltage to produce a pulsating voltage, and a converter circuit configured to convert the pulsating voltage into the first DC voltage or the second DC voltage, and
the controller is configured to control the converter circuit so that a voltage to be output from the converter circuit is switched to the first DC voltage or the second DC voltage.

7. The lighting equipment of claim 5, wherein
the DC power supply comprises
   a converter circuit comprises a first inductor and a first switching device that are electrically connected in series with each other and configured to be supplied with a DC voltage, and a first smoothing capacitor configured to be charged by at least an ON-OFF switching operation of the first switching device,
   a voltage sensor that is electrically connected in parallel with the first smoothing capacitor and configured to detect a voltage across the first smoothing capacitor as an output voltage of the DC power supply to obtain a first detection value, and
   a control circuit configured to turn off the first switching device based on the first detection value,
wherein the controller comprises a series circuit of an impedance device and a switch device, the series circuit being electrically connected in parallel with an impedance device, the impedance device being electrically connected in series with the voltage sensor while a series circuit of the impedance device and the voltage sensor is electrically connected in parallel with the first smoothing capacitor,
the controller being configured to turn off the switch device when supplying the LED light source with the first output voltage, and turn on the switch device when supplying the LED light source with the second output voltage.

8. The LED driver of claim 7, wherein
the switching regulator comprises a series circuit, which is electrically connected in parallel with the first smoothing capacitor, of a second smoothing capacitor, a second inductor and a second switching device,
the dropper regulator comprises an active device that has variable ON resistance and is electrically connected in parallel with at least the second switching device of the series circuit of the switching regulator, the LED driver comprises a sensor circuit that is configured to detect an electric current flowing through the second switching device to obtain a second detection value and also detect an electric current flowing through the active device to obtain a third detection value, and the controller is configured to:

when the switch device is turned off, control an ON-OFF switching operation of the second switching device so that the second detection value corresponds to an electric current value of a light output represented by a dimming signal for setting the light output of the LED light source; and also when the switch device is turned on, adjust the ON resistance of the active device so that the third detection value corresponds to an electric current value of a light output represented by the dimming signal.

9. A light fixture, comprising:
the lighting equipment of claim 5; and
a fixture body that supports at least the LED light source.

10. A light fixture, comprising:
the lighting equipment of claim 6; and
a fixture body that supports at least the LED light source.

11. A light fixture, comprising:
the lighting equipment of claim 7; and
a fixture body that supports at least the LED light source.

12. A light fixture, comprising:
the lighting equipment of claim 8; and
a fixture body that supports at least the LED light source.

* * * * *